(Model.)
L. M. LAWLESS.
ROLLER SKATE.
No. 313,744. Patented Mar. 10, 1885.
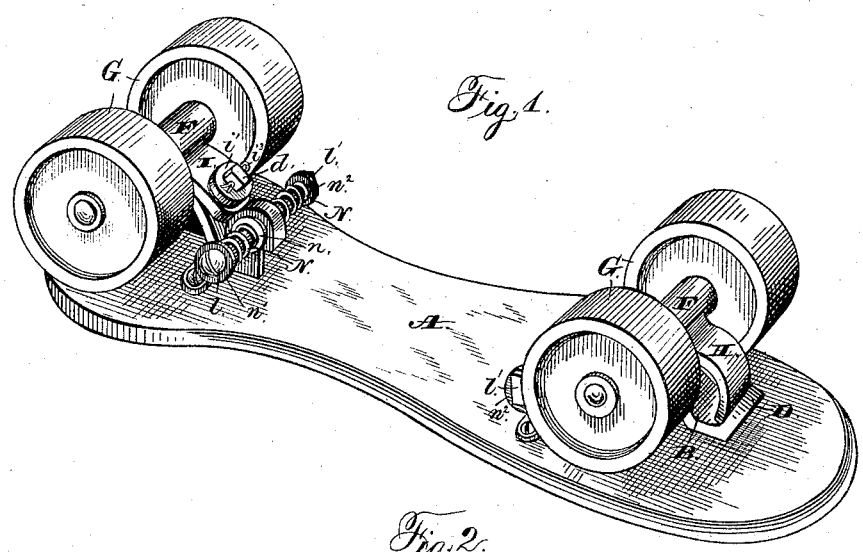
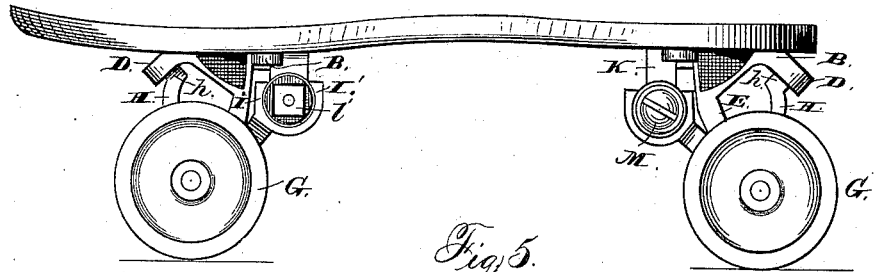
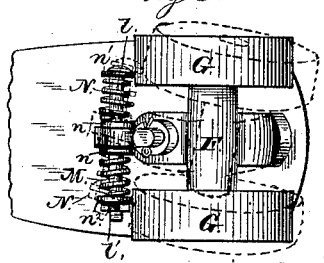
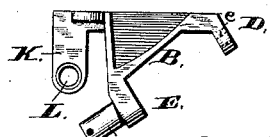
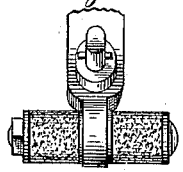
Witnesses:
J. C. Turner
Jas. E. Hutchinson
Inventor:
L. M. Lawless, by
Prindle and Russell, his Attys

UNITED STATES PATENT OFFICE.

LEVI M. LAWLESS, OF GENESEO, ILLINOIS.

ROLLER-SKATE.

SPECIFICATION forming part of Letters Patent No. 313,744, dated March 10, 1885.

Application filed July 17, 1884. (Model.)

*To all whom it may concern:*

Be it known that I, LEVI M. LAWLESS, of Geneseo, in the county of Henry, and in the State of Illinois, have invented certain new and useful Improvements in Roller-Skates; and I do hereby declare that the following is a full, clear, and exact description thereof, reference being had to the accompanying drawings, in which—

Figure 1 shows a perspective view of the bottom of my skate; Fig. 2, a view in side elevation; Fig. 3, a detail bottom plan view of one of the sets of rollers with its truck and bracket, the parts in position as when the skate is turning to one side; Fig. 4, a detail view of the pivoted truck or roller-carriage; Fig. 4$^a$, a detail sectional view on line $x\ x$ of Fig. 4; Fig. 5, a detail view showing the fixed or attaching bracket, and Fig. 6 a detail view showing a modified form of spring.

Letters of like name and kind refer to like parts in each of the figures.

The object of my invention is to provide an improvement in roller skates; and to this end it consists in the construction, arrangement, and combination of parts, as hereinafter set forth, and more specifically pointed out in the claims.

In the drawings, A designates the sole or foot-plate of the skate. To the bottom of this, near the heel and toe ends thereof, are fastened by screws or otherwise, as desired, the brackets B and B. Each of these brackets, as usual in roller-skates, has the downwardly-projecting lugs or ears D E at its rear and forward ends. These lugs stand in the same vertical longitudinal plane through the center of the skate. The front lug of the heel-bracket is lower than the rear one, and on its front has a stud, $d$, which is inclined downward and forward in line with the opening $e$ through the rear short lug, D. The truck or casing F of the rollers G G has at its rear side an upwardly-projecting arm or tongue, H, provided with a stud, $h$, journaled in the opening $e$, and at its forward side with an upwardly and forwardly projecting arm, I, which has an opening, $i$, fitting the stud $d$ on the bracket. On this stud are the two metal washers $i'$, having between them the elastic washer $i^2$. A pin, $i^3$, through the stud serves to keep the washers on the stud and bearing against the arm I of the truck. With this construction the pivotal or axial line upon which the truck rocks will be, as usual in roller-skates, a downward and forwardly inclined one for the rear truck. The same construction is used for the forward truck, except that the truck and bracket are turned around so that the axial or pivotal line of the truck is inclined rearward and downward. With this construction, as is well known, pressure upon one side or the other of the foot-plate A will cause the roller-trucks to turn, so that the rollers will run on a curve toward the side upon which the pressure is brought to bear.

To bring the trucks into the same straight line again after the pressure on one side of the foot-plate is removed, springs in various forms have been used engaging lugs or projections on the trucks and tending to return such lugs or projections to positions in line with a central longitudinal line through the skate.

In the truck-aligning mechanism as heretofore constructed, with springs engaging the opposite ends of a lug, projection, or arm on the truck, there has been a tendency to compress the spring on one side more than on the other. The result of this has been that the springs on the different sides of the projection or lug on the truck become unequal in power, and the truck will consequently not be returned to its proper position by them.

The object of my present invention is to avoid this objection and provide a truck-aligning mechanism in which the springs on both sides will be brought into action at the same time and subjected to equal strains. At its upper end the arm I is forked, as shown. The arms I' I$^2$ of the fork are vertical and stand in front and rear, respectively, of the downwardly-projecting lug K from the bracket-plate. This lug forms a stationary center, and by the means to be described the fork I' I$^2$ will always be brought under and in line with it when there is no unequal pressure on the sides of the foot-plate.

Through the lug K from side to side at its lower end is the opening L, which, as shown, flares outward toward each side from its central point. This is to allow of the rocking motion of a rod, M, which passes loosely through the opening L. This rod is preferably in the form of a bolt, having the head $l$ on one end and the nut $l'$ on the screw-threaded portion at the other end.

On each side of the lug or center K, and surrounding the rod M, is a spring, N. On the rod are the washers $n$ $n$ on each side of the fork I' I² and center K, toward and against which they are forced by the springs, as shown in the drawings. On the rod at one end, bearing against the inner side of head $l$, is the washer $n'$, and bearing against the nut on the other end is the washer $n^2$. These washers can be dispensed with, if desired, without departing from my invention. They serve to protect the ends of the springs from wear against the truck-fork or center lug, K, and the head and nut on the rod M.

In Figs. 1 and 2, I show spiral springs; but, if desired, rubber springs in the form of hollow cylinders or sleeves can be placed on the rod between the washers, as shown in Fig. 6.

With the construction as hereinbefore set forth the springs on each side force the washers $n$ $n$ inward toward and against the sides of the center lug, K. In so doing they obviously must force the washers against the sides of the truck-fork I' I², so as to bring it into line with the lug, as shown in the drawings.

In the skates as heretofore made the springs have been entirely independent of each other, and when the truck was swung on its pivot only one spring on one side would be compressed at a time. As a result of this, the spring on one side would become weaker than the other through greater use, and the truck would not be brought properly into line with the other when the pressure on the side of the foot-plate was removed. With my construction both springs are equally compressed at each swing of the truck on its pivot to one side or the other, and one will not then be weakened by greater use than the other is subjected to. Instead of one spring being relied upon to return the truck into proper position, both springs are called into play and act at once to align said truck. When, for instance, the tongue or arm I on the truck is swung to one side, the spring on the rod at that side is compressed, as shown in Fig. 3, between the washers on the rod, the fork on the tongue pressing the inner washer toward the outer one. Such compression of this spring tends to draw or pull the rod M through the center lug, K, toward that side. As the rod is pulled through the lug, the spring on the other end of the rod will obviously be compressed between the washer on the outer end of the rod and the inner washer which bears against the center lug, K. Both springs will then be equally compressed and will act with equal force to bring the tongue I and the fork thereon back into line again with the center lug. The springs being brought into action together will always be subjected to the same amount of wear, and will not lose their strength or become weakened unequally. By means of the nut on the rod M the tension of the springs can be easily and readily adjusted. Obviously, it will make no difference if the springs are or should become of unequal strength, for the rod is free to slide through the center lug, K, to compensate for any difference in their strength and to equalize the power exerted by them.

Having thus set forth the nature and merits of my invention, what I claim is—

1. In a roller-skate, the combination of the pivoted roller-truck provided with a central arm or tongue, the center lug, and a rod passing loosely through the lug and having independent springs on each end adapted to force the tongue inward into line with the center lug, substantially as shown and described.

2. In a roller-skate, the combination of the pivoted roller-truck, the fixed center lug, the tongue on the truck, forked at its upper end to embrace the lug, the rod passing loosely through an opening in the lug, and the springs on the rod on each side of the lug and fork of the tongue, bearing at their outer ends against limiting devices, substantially as described, on the rod, substantially as and for the purpose set forth.

3. In a roller-skate, the combination of the stationary center lug projecting downward from the foot-plate, the pivoted roller-truck provided with a tongue having a fork, the arms of which extend in front and rear of the lug, a transverse rod passing loosely through the lug, washers on the rod on each side of the lug, and springs on the rod between such washers, and limiting devices, substantially as set forth, on the ends of the rod, substantially as and for the purpose described.

4. In a roller-skate, the combination of the pivoted roller-truck having the tongue and fork thereon, the fixed stationary lug extending between the arms of the fork, the transverse sliding rod passing through the lug, and having the head on one end and the adjustable nut on the other, the springs on the rod on each side of the lug and fork, and suitable washers for protecting the ends of the springs, substantially as shown and described.

5. In a roller-skate, in combination with the pivoted truck having the forked arm, the fixed center lug extending down from the foot-plate and situated between the arms of the fork on the tongue, the transverse rod passing loosely through the lug, having a fixed head on one end and an adjustable nut on the other, the washers on the rod bearing against the sides of the center lug and fork, washers on the outer ends of the rod, and the springs on the rod between the outer and inner washers, substantially as shown and described.

In testimony that I claim the foregoing I have hereunto set my hand this 20th day of May, A. D. 1884.

LEVI M. LAWLESS.

Witnesses:
 RALPH FARRELL,
 GEO. T. THOMAS.